US012479016B2

(12) United States Patent
Jones et al.

(10) Patent No.: US 12,479,016 B2
(45) Date of Patent: Nov. 25, 2025

(54) METHOD AND SYSTEM FOR REMOVING CONTAMINANTS FROM SOIL

(71) Applicant: Brice Environmental Services Corporation, Fairbanks, AK (US)

(72) Inventors: Craig Jay Jones, Fairbanks, AK (US); Steven Russell Becker, San Diego, CA (US); Robert Eugene Puckitt, Santa Fe, TX (US); Alan Randy Hattenburg, Dalton Gardens, ID (US)

(73) Assignee: Brice Environmental Services Corporation, Fairbanks, AK (US)

( * ) Notice: Subject to any disclaimer, the term of this patent is extended or adjusted under 35 U.S.C. 154(b) by 683 days.

(21) Appl. No.: 17/959,559

(22) Filed: Oct. 4, 2022

(65) Prior Publication Data

US 2023/0113100 A1 Apr. 13, 2023

Related U.S. Application Data

(60) Provisional application No. 63/251,900, filed on Oct. 4, 2021.

(51) Int. Cl.
| | |
|---|---|
| *B09C 1/02* | (2006.01) |
| *B01D 15/20* | (2006.01) |
| *B01D 15/36* | (2006.01) |
| *B01J 20/20* | (2006.01) |
| *B01J 41/04* | (2017.01) |
| *B01J 41/12* | (2017.01) |
| *B01J 49/57* | (2017.01) |
| *B01J 49/60* | (2017.01) |

(Continued)

(52) U.S. Cl.
CPC .............. *B09C 1/02* (2013.01); *B01D 15/203* (2013.01); *B01D 15/361* (2013.01); *B01J 20/20* (2013.01); *B01J 41/04* (2013.01); *B01J 41/12* (2013.01); *B01J 49/57* (2017.01); *B01J 49/60* (2017.01); *C02F 9/00* (2013.01); *C02F 1/004* (2013.01); *C02F 1/283* (2013.01); *C02F 1/42* (2013.01); *C02F 2101/36* (2013.01); *C02F 2303/16* (2013.01)

(58) Field of Classification Search
None
See application file for complete search history.

(56) References Cited

U.S. PATENT DOCUMENTS 3,835,032 A * 9/1974 Dulbear ............... C10G 35/095
502/65
5,599,372 A * 2/1997 Pommier ............... C22B 3/1625
588/407

(Continued)

*Primary Examiner* — John J Figueroa
(74) *Attorney, Agent, or Firm* — Lowe Graham Jones PLLC; Ellen M. Bierman (57) ABSTRACT

Methods, systems, and techniques for removal of PFAS contaminants from contaminated soil or sediment are provided. Example embodiments provide a water-based ex-situ method and system at a site that utilizes particle size and particle density segregation; deagglomeration, attrition, and retention time and sequential contacts with purified water; a recirculating water system with continual water treatment, and additional modules for destructive treatment of concentrated PFAS. In an example embodiment, the water treatment system of an example PFAS contaminant removal system and process includes ion exchange resin filtration component to remove PFAS effectively.

19 Claims, 6 Drawing Sheets

(51) Int. Cl.
*C02F 9/00* (2023.01)
*C02F 1/00* (2023.01)
*C02F 1/28* (2023.01)
*C02F 1/42* (2023.01)
*C02F 101/36* (2006.01)

(56) References Cited

U.S. PATENT DOCUMENTS

2020/0002203 A1\* 1/2020 Gill .......................... B09C 1/08
2023/0062836 A1\* 3/2023 Zsolt ........................ A62D 3/40

\* cited by examiner

METHOD AND SYSTEM FOR REMOVING CONTAMINANTS FROM SOIL

CROSS-REFERENCE TO RELATED APPLICATIONS

This application claims the benefit of U.S. Provisional Patent Application No. 63/251,900, entitled "METHOD AND SYSTEM FOR REMOVING CONTAMINANTS FROM SOIL," filed Oct. 4, 2021, which application is incorporated herein by reference in its entirety.

TECHNICAL FIELD

The present disclosure relates to methods, techniques, and systems for removing contaminants from soil and, in particular, to methods, techniques, and systems for removing per- and polyfluoroalkyl substances from soil.

BACKGROUND

Per- and polyfluoroalkyl substances (PFAS) have been a primary ingredient in aqueous film-forming foams (AFFF) used by the United States (U.S.) military, civilian airports, fire training and other facilities to extinguish hydrocarbon fires for almost 50 years. Certain PFASs are highly mobile, bioaccumulative, persistent in the environment, and have been shown to pose a human health risk. The Department of Defense has a widespread occurrence of soils and/or sediments (hereinafter "soils") contaminated with poly- and perfluoroalkyl substances (PFAS) at levels exceeding migration-to-groundwater or human health cleanup levels. There are three known field-implemented technologies for PFAS-impacted solid media, including soils: sorption and stabilization, excavation and disposal, or excavation and incineration (Interstate Technology & Regulatory Council (ITRC), 2021, PFAS Technical and Regulatory Guidance Document and Fact Sheets PFAS-1, Section 12.3 Field-Implemented Solids Treatment Technologies. Washington, D.C.: Interstate Technology & Regulatory Council, PFAS Team, "https://pfas-1.itrcweb.org/12-treatment-technologies/#12_3," hereinafter "ITRC 2021").

Sorption and Stabilization

Under sorption and stabilization, amendments are added to the soil to reduce the potential for PFAS to mobilize from soil to groundwater or surface water. This occurs primarily through electrostatic interactions between the negative charge on the PFAS functional group and the positive charges on the sorbent and hydrophobic interactions between the amendment and the electronegative carbon-fluorine chain on the PFAS (ITRC 2021). Typical amendments that have been demonstrated in the field include activated carbon and composite materials such as a blend of aluminum hydroxide, kaolin, and carbon specifically designed to treat anionic, cationic, and zwitterionic long- and short-chain PFAS. PFAS-adsorbing materials can be applied through in situ soil mixing or ex situ stabilization (for example, pug mill mixing) to reduce the leachability of PFAS from contaminated soil/sediment through physical and/or chemical bonding.

Excavation and Disposal

Excavation and disposal involves removing contaminated soil for off-site disposal (ITRC 2021). The contaminated material is disposed of at a permitted landfill, then the excavated area is filled with clean backfill. This method effectively removes a source area that may otherwise serve as a continuing source of groundwater contamination but does not result in destruction of the PFAS. Soil excavation and disposal is a well-demonstrated, proven technology. However, PFAS have been reported in landfill leachate. In some states, landfill leachate is not analyzed or regulated for PFAS. Disposal of PFAS waste to landfills potentially adds to the PFAS contaminant load in the landfill leachate. Some nonhazardous waste landfills do not accept PFAS waste.

Excavation and Incineration

Excavation and incineration involves removing contaminated soil from a site and destruction of PFAS using heat (ITRC 2021). Heat is applied directly to PFAS-contaminated soils, with vaporized combustion products being captured and further oxidized at elevated temperatures. While incineration is a mature technology that has been used for various solid and liquid wastes, factors such as effective destructive temperatures and treatment time, the potential to generate products of incomplete combustion, stack gas analyses, and potential for land deposition are currently being evaluated. Incineration of contaminated soils is energy intensive, and the environmental footprint for incineration includes transportation and supplemental fuel for the incineration process.

Disadvantages of Existing Technologies

The main disadvantage of the sorption and stabilization and the excavation and disposal technologies is that these technologies do not destroy the contaminants, but either bind them for potential later release as the absorption media degrades or relocates them to landfills where they may contribute to further leaching of PFAS to groundwater or surface waters. Excavation and incineration technology, while it has the potential to destroy PFAS, is energy intensive, and the potential for incomplete combustion products to reach the environment are not well understood.

BRIEF DESCRIPTION OF THE DRAWINGS

Various example embodiments are described in greater detail below with reference to the drawings, in which like terms are identified by the same reference designation.

DETAILED DESCRIPTION

Embodiments described herein provide an environmentally-sustainable system, method, and process for removal of PFAS contamination from contaminated soils and/or sediments. Example embodiments provide a PFAS contaminant removal system ("PCRS") that reduces the volume of contaminated materials potentially requiring secondary treatment, concentrates PFAS compounds in an aqueous solution, and then further distills them into a high-concentration aqueous solution if appropriate, and superloads the compounds in a highly-concentrated immobilized form for disposal.

Due to the high miscibility of PFAS in water and their suspected tendency to bind to the finer soil fractions, it was hypothesized that the techniques and systems of earlier patented water-based physical separation process described in detail in U.S. Pat. Nos. 7,399,141, and 7,255,514 would be effective at reducing the volume of PFAS-contaminated soils requiring secondary treatment. Bench-scale studies were conducted to test this concept using PFAS impacted soils from two different Department of Defense facilities. The studies confirmed that PFAS is found predominately in the finer soil fractions, which supported the potential efficacy of the earlier patented physical separation process. Based on the results of one of the bench-scale studies, a full-scale pilot study was initiated. A patented soil treatment plant was then mobilized to Peterson AFB to process PFAS impacted soils and to evaluate optimization of the process specifically for PFAS impacted soils.

The improved process developed for contaminant removal is based on one characteristic for PFAS to disassociate (e.g., be desorbed) from the soil particles and into a water-based solution. Bench and field implementation findings revealed that the degree that PFAS moves from soil into solution is based on (1) the particular PFAS compound (or combination of compounds) present in the soil, (2) retention time of the soil particles in solution under mechanical agitation, (3) the concentration of PFAS already in solution, (4) the soil/water ratio, (5) the number of consecutive contacts for the soil particles with a water-based solution low in PFAS, and (6) final rinsing and dewatering of the soil with ultra clean water.

Physical treatment of the soil is substantially similar to that described in U.S. Pat. Nos. 7,399,141, and 7,255,514, which patents are incorporated by reference in their entireties. Particle size and particle density segregation is performed to isolate and focus treatment factors (e.g., retention time, consecutive contacts in low-PFAS water, and soil/water ratio) on the more contaminated soil fractions. Deagglomeration, mechanical agitation, and attrition in the presence of a low-PFAS water based solution assist in moving the PFAS adhered to the surface of the soil particles and those contained in macro- and micro-pores of aggregated soil particles into solution. Outputs of physical treatment generally include organic materials, washed gravels of one or more size and/or density fractions, washed sands of one or more size and/or density fractions, and dewatered fines (silt- and clay-sized materials). The exact components and configuration of the physical treatment plant that may be used are detailed in the above patents and are based on the factors presented in FIGS. 2 and 3A-3D.

The transfer of PFAS into solution coupled with the need to continuously wash soils with low-PFAS water requires a substantially more robust water treatment system than is described in the prior patents. Brice Environment Services Corp. ("Brice") designs and implements a particular water treatment system based on PFAS chemistry, the specific PFAS compounds present, post-physical treatment of PFAS concentrations in solution, and the water flows required to achieve planned production rate(s) for continuous material processing with closed-loop water treatment. Due to a need to keep PFAS concentrations in solution low in order to effectively drive PFAS from soil to the solution, water within this closed-loop system ("process water") requires continuous treatment at flow rates typically ranging from 600 to 1,000 gallons per minute (gpm). The water treatment system also needs to be sufficiently robust to achieve regulatory standards for drinking water prior to discharge upon project completion. The components of this water treatment system include both the sand- and granular activated carbon (GAC) filtration described in the prior patents as well improvements to incorporate PFAS-specific single-use or regenerable ion exchange (IX) resin filtration. The innovative use of PFAS specific IX resin filtration is described in further detail in relation to FIG. 1 below To achieve site-specific cleanup standards for PFAS in soil, a treatability study is conducted to determine the above treatment parameters (e.g., the physical soil characteristics, PFAS chemistry, and planned production rate(s)). Soils containing high concentration of PFAS for example will require a greater soil/water contact ratio, greater retention times, and increased number of contacts with clean water than soils containing lower concentrations of PFAS.

The improved PFAS contaminant removal process and system consists of unit components whose selection is site-specific. The variability in unit components, scale, and soil characteristics thus result in there being no one set process to which exact units, water and material flow rates can be applied. The improved contaminant removal system of example embodiments is site-specific and as such, the equipment array and corresponding water and material flows are variable.

Figure 2:
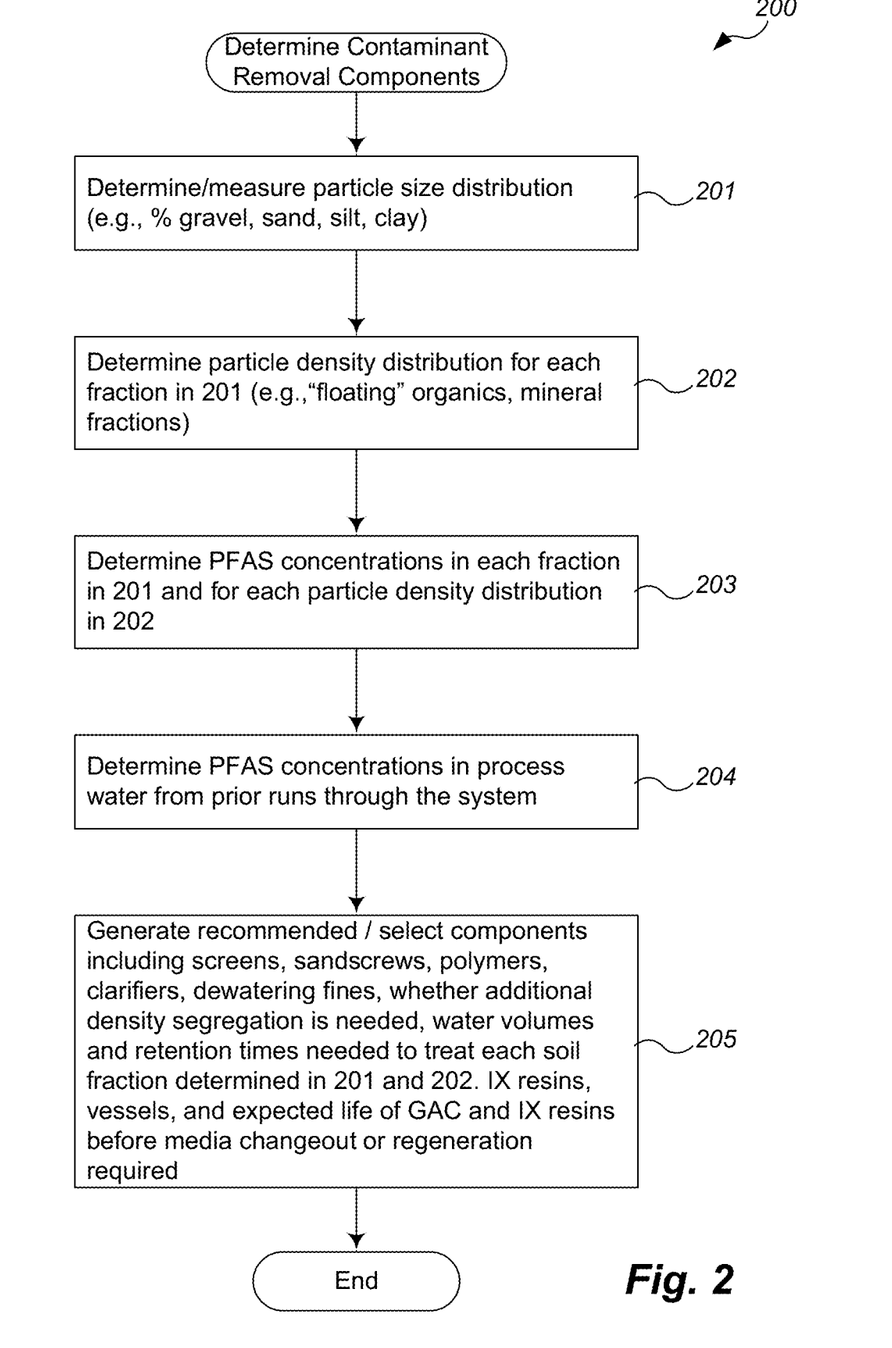
FIG. 2 is an example flow diagram for determining a selection of components for a particular PFAS contaminant removal system.
Figure 3A:
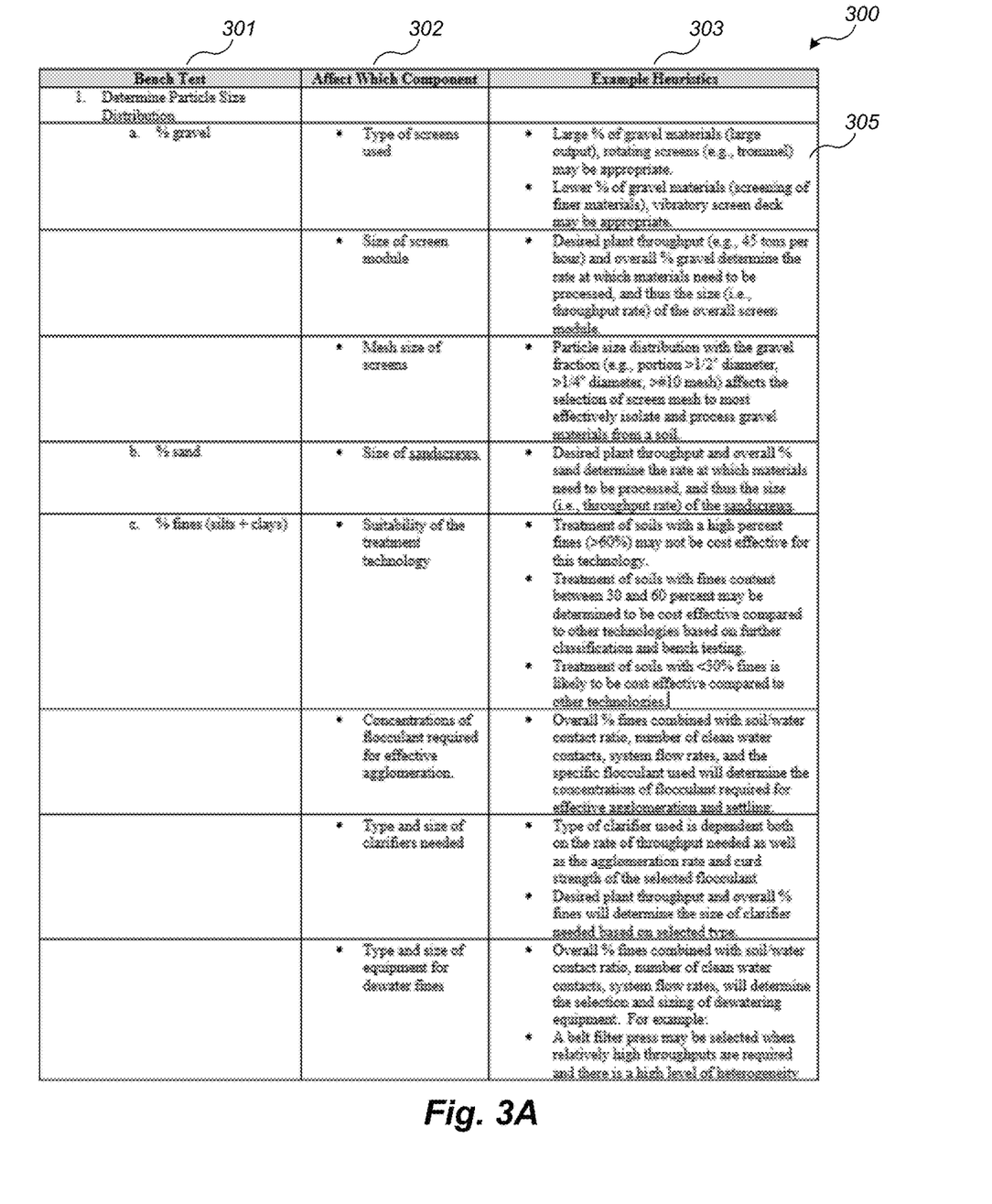
FIGS. 3A-3D are a detailed table of illustrating correspondence between variables tested prior to deployment to determine components for a particular PFAS contaminant removal system.
Figure 3B:
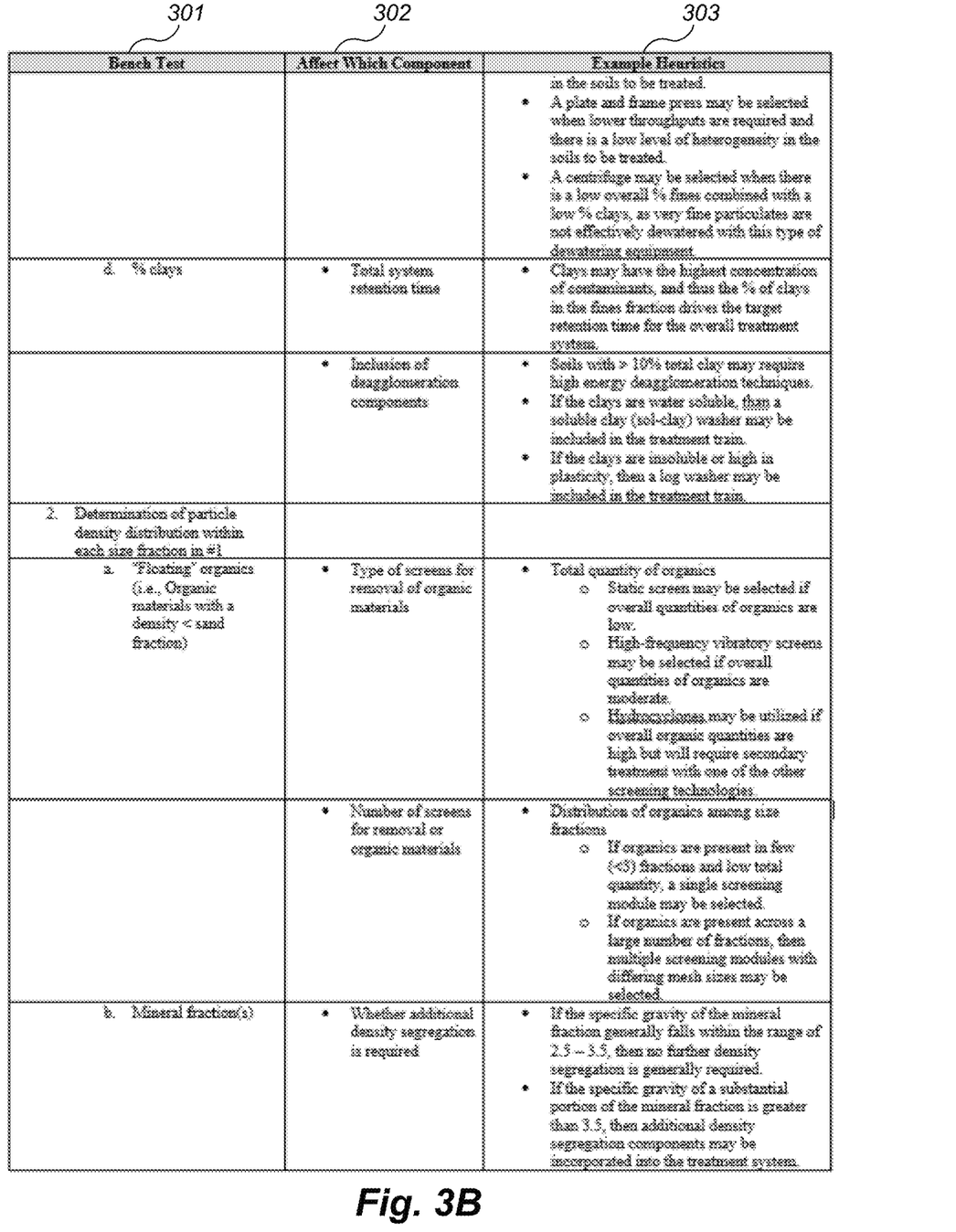
Figure 3C:
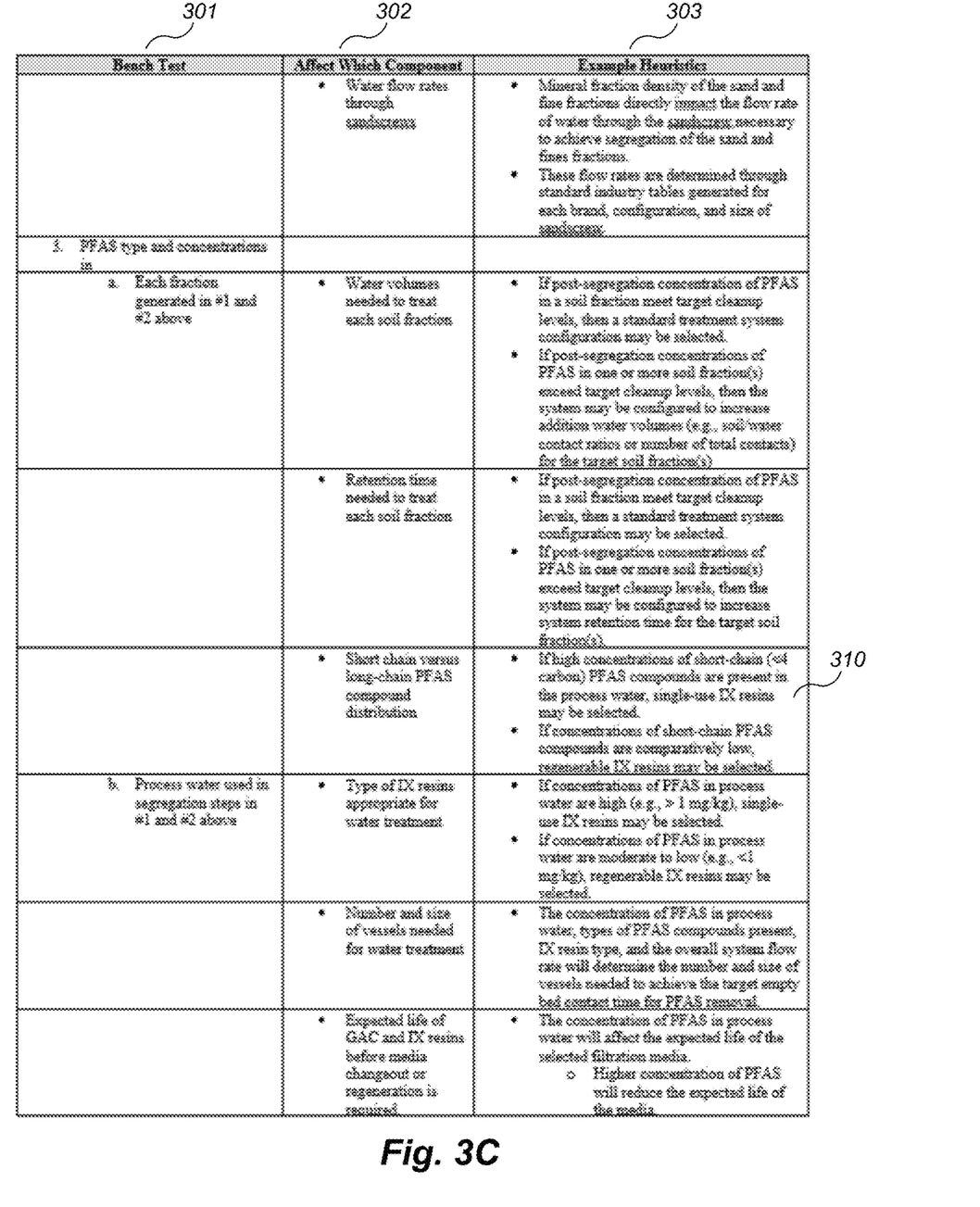
Figure 3D:
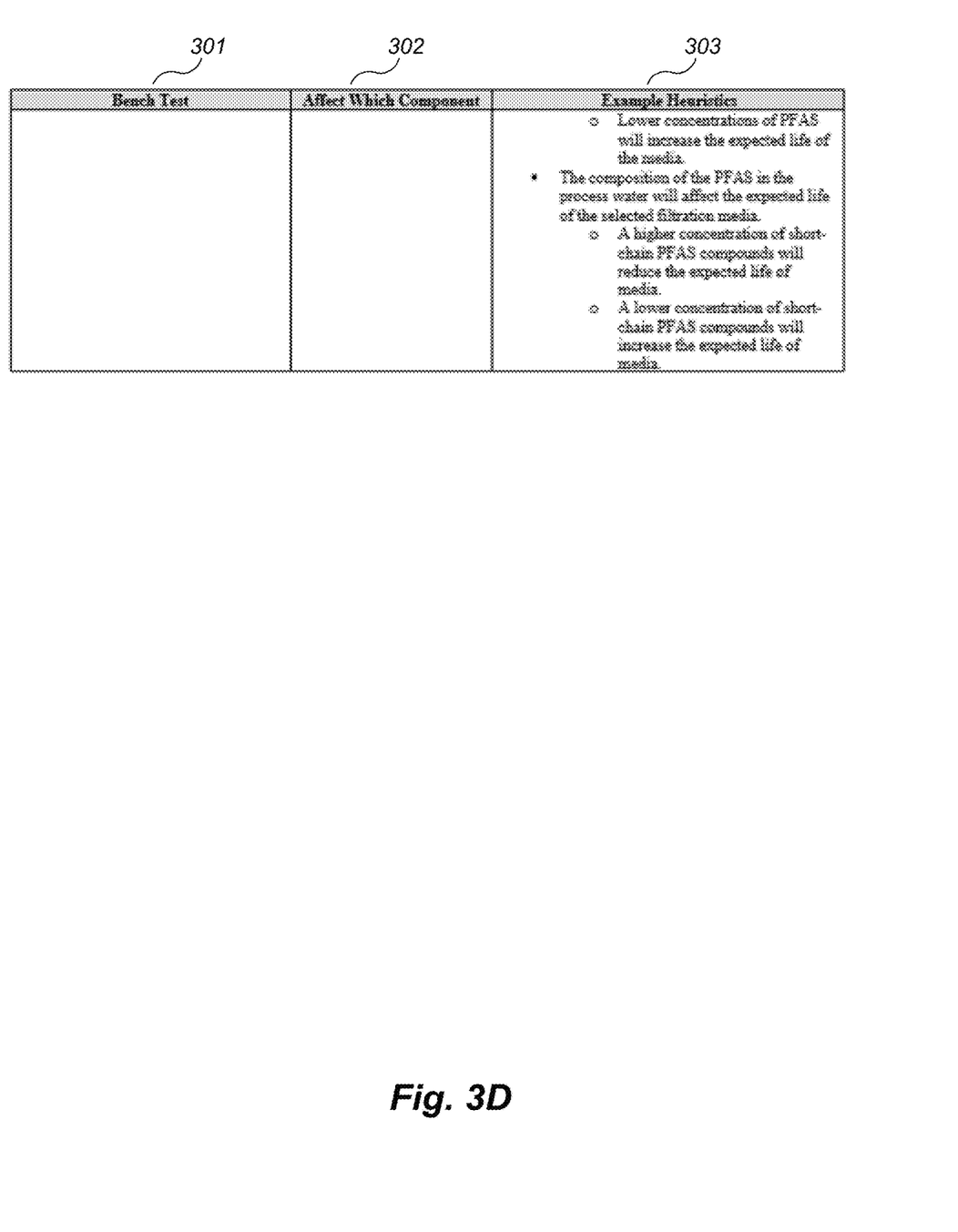

FIG. 2 is an example flow diagram for determining a selection of components for a particular PFAS contaminant removal system. The determination of contaminant removal components 200 begins with block 201, which is to determine through measurement or otherwise, the various particle size distributions. This includes determination of the percentage of gravel, percentage of sand, percentage of silt, and percentage of clay in a representative soil sample (e.g., a portion of soil) to determine a distribution of soil fractions in the soils to be treated. As explained further below in FIGS. 3A-3D, these percentages affect the size and selection of particular components of the PCRS. For example, the percentage gravel in the soil and the distribution of particle sizes within that fraction can affect the type of screens used and the mesh size of the screens, whereas the percentage of sand in the soil can affect the size and number of sandscrews required to achieve a desired production rate(s). In block 202, the method determines/measures the particle density distribution for each of the fractions determined in block 201, which can affect factors such as the size and type of screen or other equipment needed for the removal and dewatering of organic material, water flow rates needed through the sandscrews, and the selection and required concentration of polymers for flocculation of the fine soil fraction. In block 203, the method determines/measures the PFAS concentrations in each fraction determined in block 201 and each particle density distribution (fraction) in block 202. Factors affected by this block include items such as the number of sandscrews needed to achieve the required residence times and the number of contacts with low-PFAS process water as well as the residence time of flocculated fines in the thickener tank. In block 204, the method determines the PFAS concentrations in process water from blocks 201-203 to estimate the PFAS concentrations in process water of the deployed PCRS, which affects factors such as the size of filtration vessels, throughput rates, empty bed contact times (EBCTs), and the rate of replacement or regeneration needed for various filtration media. Then, in block 205, the method generates recommended or selects components to include in a particular PFAS contaminant removal system.

PCRS components can include:

Units that store, convey and mix soil at variable speeds into the plant, between plant components and for discharging soil from the plant into stockpiles. These units include various feed bins and feeders, conveyors, and pug mills.

Aggressive soil processing components that utilize water and impart a high degree of mechanical energy such as log washers and sol-clay washers to retain, deagglomerate, scour, and reduce soil into individual granules of rock, gravel, sand, silt and clay.

Static, rotating, or vibratory wet scrubbers/screens for dust-free deagglomeration and sizing the soil and soil organic material into fractions and removing from the water.

Multi-stage coarse and fine gravity or density separators, and upflow classifiers for soil organic material and fine soil separation such as sandscrews, hydrocyclones, or high frequency vibratory screens.

Chemical addition of dry and/or wet flocculants to remove suspended soil fines from the process water. This includes storage, mixing, and dispensing systems for adding benign flocculants to clarifiers, belt presses, centrifuges, and high frequency dewatering screens.

Post clarification fine soil dewatering systems such as belt presses, centrifuges, and high frequency screens.

Water treatment modules consisting of sand filtration to remove suspended solids followed by granular activated carbon (GAC) and proprietary ion exchange (IX) resins for PFAS removal from solution.

Compact, high-capacity mobile plant modules designed to be moved and easily reconfigured from site to site; and Closed-loop, water-based processing with spill controls eliminates airborne dust, while minimizing the volume of process water required.

Destructive technologies for PFAS, including technologies such as super critical water oxidation, high alkaline treatment, electrochemical oxidation, plasma generator which bubbles argon gas, and the like.

FIGS. 3A-3D is a detailed table of illustrating correspondence between variables tested prior to deployment to determine components for a particular PFAS contaminant removal system. Table 300 comprises columns 301-303 which describe bench test attribute/factor 301, components affected 302, and example heuristics (rules) 303 for determining possible components. As shown, the percentage of gravel affects the type of and mesh size of screens; the percentage of sand affects the size and number of sandscrews required; the percentage of silt affects the type of polymer required for flocculation or coagulation, the type and size of clarifiers, the type and size of equipment for dewatering the fines, and the total system retention time; and the percentage of clay affects whether a log washer or soluble clay washer are required, the type of polymer required for flocculation or coagulation, the type and size of equipment for dewatering the fines, and the total system retention time. The particle density distribution of "floating" organics affects the size and types of screens for vegetation removal, and the mineral fractions affects whether additional density segregation is required to isolate contaminated fractions.

The PFAS concentrations of each of the fractions above and the process water from each run affect required soil/water contact ratio, the number of contacts with low-PFAS water, and the retention time needed to treat each soil fraction. They also affect the type of IX resin appropriate to bind the PFAS and remove it from solution. The IX resins can be single use resins, which are used until they cannot effectively absorb additional PFAS compounds, or regenerable resins (e.g., Sorbix RePure or equivalent), which, when subjected to solvent and thereafter distilled, results in a much smaller volume of high-concentration PFAS solution to dispose of or to be sent to destructive treatment. The types of resins usable with the PCRS and processes for using single use and regenerable resins are described further below with respect to FIG. 1. The PFAS concentrations are also used to determine the number and/or size of vessels needed for water treatment and the expected life of FAC and IX resins before media changeout or regeneration are required.

As noted in FIGS. 3A-3D, the table indicates example heuristics which may be applied to determine one or more of the components in a particular assembled PCRS. For example, as show in cell 305, a large percentage of gravel materials may be indicative of large output and thus rotating screens may be appropriate for that particular PCRS implementation. Correspondingly, a lower percentage of gravel materials may be indicative of screening finer materials and thus a vibratory screen deck instead may be appropriate for that particular PCRS implementation.

As another example, the PFAS type and concentrations affect the choice of IX resins. For example, as described in cell 310, the presence of high concentrations of short-chain (<4 carbon molecules) PFAS compounds in process water may indicate appropriateness of selecting single-use IX resins for that particular PCRS implementation. Alternatively the presence of comparatively low concentrations of short-chain PFAS compounds in process water may indicate appropriateness of selecting regenerable IX resins for that particular PCRS implementation. Other factors may contribute to the selection of single-use versus regenerable IX resins and thus multiple heuristics may affect a particular choice for a particular PCRS implementation. The remaining cells in column 303 can be interpreted and incorporated similarly.

Table 300 is reproduced below as Table 1.

TABLE 1

| | Bench Test | Affect Which Component | Example Heuristics |
|---|---|---|---|
| 1. | Determine Particle Size Distribution | | |
| | a.  % gravel | Type of screens used | Large % of gravel materials (large output), rotating screens (e.g., trommel) may be appropriate. Lower % of gravel materials (screening of finer materials), vibratory screen deck may be appropriate. |
| | | Size of screen module | Desired plant throughput (e.g., 45 tons per hour) and overall % gravel determine the rate at which materials need to be processed, and thus the size (i.e., throughput rate) of the overall screen module. |

TABLE 1-continued

| Bench Test | Affect Which Component | Example Heuristics |
|---|---|---|
| | Mesh size of screens | Particle size distribution with the gravel fraction (e.g., portion >½" diameter, >¼" diameter, >#10 mesh) affects the selection of screen mesh to most effectively isolate and process gravel materials from a soil. |
| b. % sand | Size of sandscrews | Desired plant throughput and overall % sand determine the rate at which materials need to be processed, and thus the size (i.e., throughput rate) of the sandscrews. |
| c. % fines (silts + clays) | Suitability of the treatment technology | Treatment of soils with a high percent fines (>60%) may not be cost effective for this technology. Treatment of soils with fines content between 30 and 60 percent may be determined to be cost effective compared to other technologies based on further classification and bench testing. Treatment of soils with <30% fines is likely to be cost effective compared to other technologies. |
| | Concentrations of flocculant required for effective agglomeration. | Overall % fines combined with soil/water contact ratio, number of clean water contacts, system flow rates, and the specific flocculant used will determine the concentration of flocculant required for effective agglomeration and settling. |
| | Type and size of clarifiers needed | Type of clarifier used is dependent both on the rate of throughput needed as well as the agglomeration rate and curd strength of the selected flocculant. Desired plant throughput and overall % fines will determine the size of clarifier needed based on selected type. |
| | Type and size of equipment for dewater fines | Overall % fines combined with soil/water contact ratio, number of clean water contacts, system flow rates, will determine the selection and sizing of dewatering equipment. For example: A belt filter press may be selected when relatively high throughputs are required and there is a high level of heterogeneity in the soils to be treated. A plate and frame press may be selected when lower throughputs are required and there is a low level of heterogeneity in the soils to be treated. A centrifuge may be selected when there is a low overall % fines combined with a low % clays, as very fine particulates are not effectively dewatered with this type of dewatering equipment. |

TABLE 1-continued

| | Bench Test | Affect Which Component | Example Heuristics |
|---|---|---|---|
| d. | % clays | Total system retention time | Clays may have the highest concentration of contaminants, and thus the % of clays in the fines fraction drives the target retention time for the overall treatment system. |
| | | Inclusion of deagglomeration components | Soils with >10% total clay may require high energy deagglomeration techniques. If the clays are water soluble, than a soluble clay (sol-clay) washer may be included in the treatment train. If the clays are insoluble or high in plasticity, then a log washer may be included in the treatment train. |
| 2. Determination of particle density distribution within each size fraction in #1 | | | |
| a. | "Floating" organics (i.e., Organic materials with a density < sand fraction) | Type of screens for removal of organic materials | Total quantity of organics Static screen may be selected if overall quantities of organics are low. High-frequency vibratory screens may be selected if overall quantities of organics are moderate. Hydrocyclones may be utilized if overall organic quantities are high but will require secondary treatment with one of the other screening technologies. |
| | | Number of screens for removal or organic materials | Distribution of organics among size fractions If organics are present in few (<3) fractions and low total quantity, a single screening module may be selected. If organics are present across a large number of fractions, then multiple screening modules with differing mesh sizes may be selected. |
| b. | Mineral fraction(s) | Whether additional density segregation is required | If the specific gravity of the mineral fraction generally falls within the range of 2.5-3.5, then no further density segregation is generally required. If the specific gravity of a substantial portion of the mineral fraction is greater than 3.5, then additional density segregation components may be incorporated into the treatment system. |
| | | Water flow rates through sandscrews | Mineral fraction density of the sand and fine fractions directly impact the flow rate of water through the sandscrew necessary to achieve segregation of the sand and fines fractions. These flow rates are |

TABLE 1-continued

| | Bench Test | Affect Which Component | Example Heuristics |
|---|---|---|---|
| | | | determined through standard industry tables generated for each brand, configuration, and size of sandscrew. |
| 3. | PF AS type and concentrations in | | |
| a. | | Each fraction generated in #1 and #2 above | Water volumes needed to treat each soil fraction | If post-segregation concentration of PFAS in a soil fraction meet target cleanup levels, then a standard treatment system configuration may be selected. If post-segregation concentrations of PFAS in one or more soil fraction(s) exceed target cleanup levels, then the system may be configured to increase addition water volumes (e.g., soil/water contact ratios or number of total contacts) for the target soil fraction(s) |
| | | Retention time needed to treat each soil fraction | If post-segregation concentration of PFAS in a soil fraction meet target cleanup levels, then a standard treatment system configuration may be selected. If post-segregation concentrations of PFAS in one or more soil fraction(s) exceed target cleanup levels, then the system may be configured to increase system retention time for the target soil fraction(s). |
| | | Short chain versus long-chain PFAS compound distribution | If high concentrations of short-chain (<4 carbon) PFAS compounds are present in the process water, single-use IX resins may be selected. If concentrations of short-chain PFAS compounds are comparatively low, regenerable IX resins may be selected. |
| b. | | Process water used in segregation steps in #1 and #2 above | Type of IX resins appropriate for water treatment | If concentrations of PFAS in process water are high (e.g., >1 mg/kg), single-use IX resins may be selected. If concentrations of PFAS in process water are moderate to low (e.g., <1 mg/kg), regenerable IX resins may be selected. |
| | | Number and size of vessels needed for water treatment | The concentration of PFAS in process water, types of PFAS compounds present, IX resin type, and the overall system flow rate will determine the number and size of vessels needed to achieve the target empty bed contact time for PFAS removal. |
| | | Expected life of GAC and IX resins before media changeout or regeneration is required. | The concentration of PFAS in process water will affect the expected life of the selected filtration media. Higher concentration of PFAS will reduce the expected life of the media. Lower concentrations of PFAS will increase the expected life of the media. |

TABLE 1-continued

| Bench Test | Affect Which Component | Example Heuristics |
|---|---|---|
| | | The composition of the PFAS in the process water will affect the expected life of the selected filtration media. A higher concentration of short-chain PFAS compounds will reduce the expected life of media. A lower concentration of short-chain PFAS compounds will increase the expected life of media. |

Figure 1:
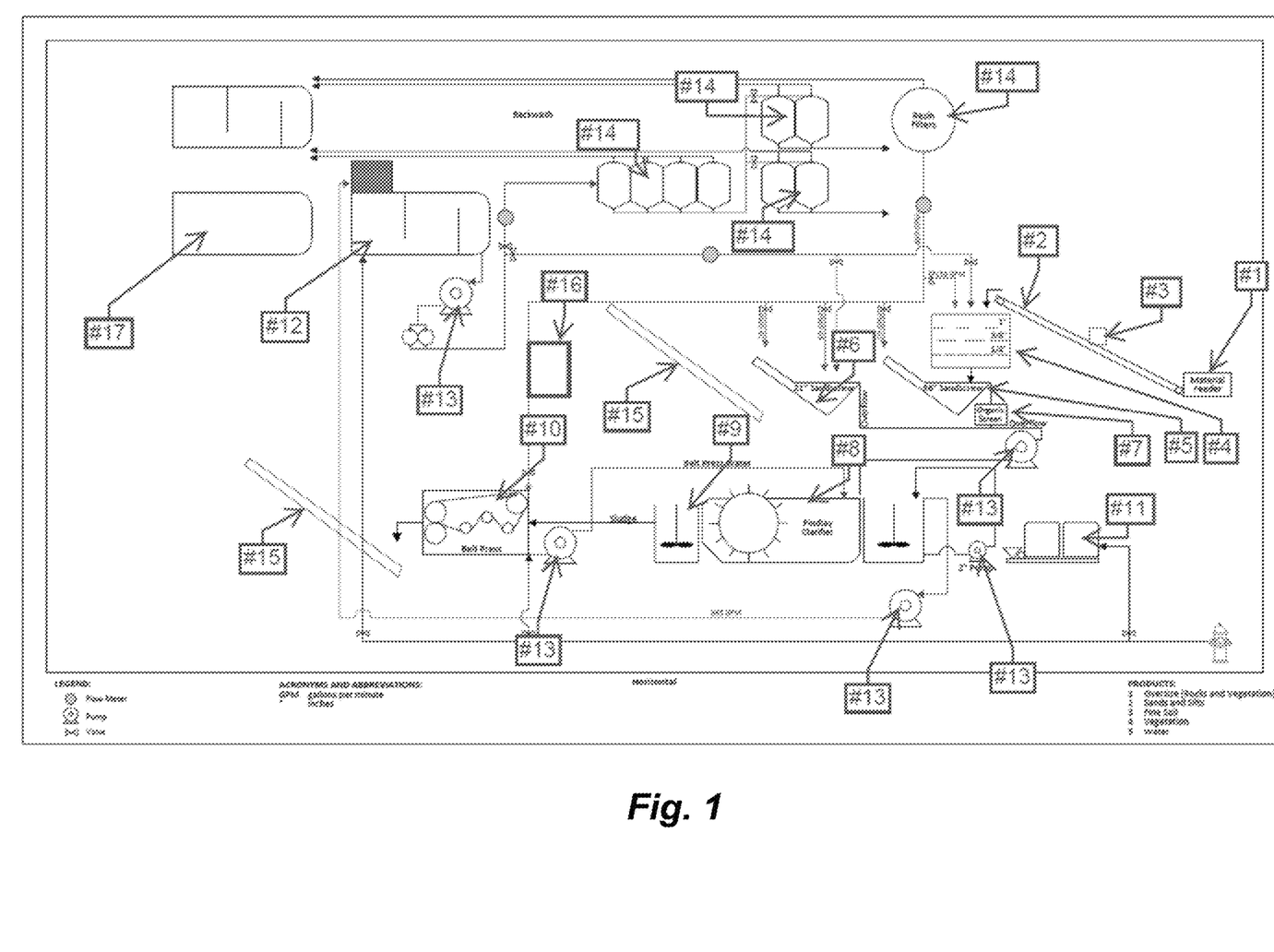
FIG. 1 is a block diagram of example components of an example PFAS contaminant removal system.

FIG. 1 is a block diagram of example components of an example PFAS contaminant removal system. The process flow through the various components is also illustrated. The PCRS comprises feeder (1) and conveyor (2), conveyor magnet (#3), screen decks (4), sandscrew #1 (5), sequential sandscrews #2-n (6), organic removal screen (7), clarifiers (8), thickener tank (9), belt press (10), flocculant skid (11), water storage tank (12), pumps (13), and water treatment system (14). As mentioned above, the particular components chosen for a particular site are dependent upon the pre-treatment analysis of the soil and PFAS concentrations as described with reference to FIGS. 2 and 3A-3D.

An example PFAS contaminant removal system 100 comprises a soil feeder (1) or feed/surge bin in the form of a 13'×9' steel feed hopper with a 5 hp electric (440-volt 3 phase) motor and 12 cubic yard hopper capacity. The motor is equipped with a speed reduction drive, and a variable ratio pulley system for adjusting the feeder belt speed. There is also a variable height discharge gate that can be used to control feed rate of material out of the hopper. Material is brought to the plant by truck and/or loader and placed into the soil feeder bin by the loader. The discharge rate is adjusted to balance plant operation. The discharge belt places material onto a 60-foot-long conveyor (2) powered by a 2-hp. electric motor and is equipped with a Milltronics belt scale. The belt scale uses load cells to monitor weight on the belt and provides instantaneous readout of conveyor material load and integrates to provide the total plant feed between each resetting of the soil feeder. Depending on the soil, there may be oversize rock present (greater than 4-inches in diameter). A grizzly, which is a static screen, may be placed over the feeder to scalp off this oversize rock.

An example PCRS may include one or more conveyor magnets (3). There may be a need for removal of tramp steel and other materials possessing magnetic properties, which is done most beneficially prior to the material entering the wet portion of the plant. A cross belt electromagnet or permanent magnet combined with a powered conveyor that drags the magnetic material off the magnet and into a catch bin is used.

An example PCRS may include one or more screen decks (4) when gravel and rock are present in the soil. The conveyor (2) from the feeder discharges into a Goodfellow three deck vibratory screening plant with an integral sand-screw located below the screens, with a 60 hp motor powering the screening plant and a 15 hp motor powering the sandscrew. High pressure water is jetted through a series of nozzles on spray bars that are mounted over each of the three decks to provide immediate contact of the soil with water to initiate driving PFAS off the soil grains and into solution, wash each fraction to produce material free of finer material, and for dust control. For example, 1-inch, ⅜" and ¼" screens would result in separate plus 1 inch, minus 1-inch by plus ⅜-inch, and minus ⅜-inch by plus ¼-inch washed and dewatered material. The screens can be exchanged for any size fractional segregation desired down typically to a #10 mesh (0.08 inch) screen.

Water from initial washing on the screen decks (4) flows down through the screening plant and into sandscrew #1 (5) carrying finer sized soil grains in solution. A sandscrew is essentially a tub containing water with a screw, or auger. A slurry goes into the sandscrew, and solids settle out after a given retention time for transport/dewatering up and out of a pool of water and discharge from one end while the water carrying suspended fines and soil organic material is discharged out of the back of the sandscrew over a weir. The sandscrew fines cut point (the gradation that is suspended in the overflow) can be changed by the flow rate of the wash water fed to the sandscrew.

Sequential sandscrews #2 and so forth (6) offer retention time and impart abrasion on the finer soil particles, which typically consist of the majority of any given soil. A key attribute for PFAS removal from this soil fraction is predetermining the number of sandscrews required for sequential washing, dewatering, and rewashing in order for the fraction to meet cleanup criteria.

The sandscrew coarse discharge can go directly into another sandscrew as many times as required to sequentially removal PFAS off of the soil grains and into solution and reduce the PFAS concentrations of the material to the desired levels.

The slurry of fines from each of the sandscrews (6) overflow a horizontal weir and into slurry pumps for transfer to a clarifier. Pumps are typically slurry pumps with 30 hp electric (440 V 3 phase) motors, from which the fines are transferred to a Finlay Siltmaster 200 clarifier (8), in this example.

An example PCRS may include one or more organic removal screens (7). The slurry overflowing the weirs from the sandscrews (6) contains soil fines and soil organic material (leaves, twigs, grass, etc.). This slurry is combined and pumped to a stationary screen separator (7) to dewater and remove the soil organic material from the flow stream. Designed for high-capacity dewatering capabilities, the unit contains no moving parts. The assembly consists of a head box that evenly distributes and controls velocity of the incoming water flow as it spreads across an inclined profile wire panel. The slots formed by the wires run at right angles to the flow of the fluid. As the flow moves down the inclined panel the liquid layer closest to the flats of profile wire is deflected through the slots. and solids slide off the top of the deck. In one example screen (7), the screen deck is 72" wide by 54" long, with slots 0.02 in. wide, and can remove over 90% of incoming solids. All wetted parts are made of type 304 stainless steel. The recovered organic material is containerized as a separate product for disposal. High-frequency vibratory screens or hydrocyclones may also be used in this capacity.

Clarifiers (8) are mechanical tanks used to remove solid particulates or suspended solids from a liquid. As the liquid containing suspended solids enters the clarifier coagulants are added to cause finely suspended particles to clump together and form larger and denser particles, called flocs, that settle more quickly and thicken. This allows the separation of the solids in the clarifier to occur more efficiently and easily. One type of clarifier utilized by the example PCRS is the Finlay Siltmaster 150 clarifier. This clarifier comprises a feed trough where material that has been mixed with a flocculant and the formed aggregate of fine material will immediately settle, and fines will flow to the far end from the overflow growing in size by aggregation. A cylindrical form spiral blade rotates on axis and drags settled material from the overflow end to the opposite end where a bucket wheel picks up the settled material and dumps it through a chute to a thickener tank (9) for feed by a pump to a belt press. Both operations on the Finlay clarifier are powered by a 10-horsepower electric motor driven hydraulic pump driving hydraulic motors on each of the scroll and bucket wheel.

Settled fines that have fallen out of suspension in the clarifier are discharged into a thickener tank (9). In the example PCRS, this is an 8'×8'×8' metal tank equipped with a 5-horsepower mixer to maintain a consistent slurry of concentrated soil fines A continuous belt press (10) is one approach to dewater the fines. Other approaches can include a plate and frame press, screw press, centrifuge, geotube, or other equivalent technologies. Water can be added from a water treatment subsystem, if needed to optimize the formation of particles from reaction with added flocculant, prior to feed going to the belt press (10). Note that a water storage tank delivers water to the water treatment system, and to the soil organic matter storage bin.

In the example PCRS, belt press (10) is a 3-meter belt press manufactured by Bright Technologies. There are multiple motors powering the operation of this unit. The belts are driven by a total of 36.5 hp from various 440 V electric motors. The speed is adjustable through a variable frequency drive unit. The belts carry the material through a series of pinch rollers (not shown) that squeeze the free water out of the material in stages. The final discharge is a cake of material that has minimal water and is capable of being stacked. There is also a flocculant addition pump. The latter delivers a premixed flocculant to the feed material to allow it to gather and separate from the water which provides the mechanism for reducing the water content of the produced fines. Clear water also flows from belt press to storage tank. Note that tie points provide water flow from clean water treatment subsystem to other portions of the present soil contaminant removal system.

Fines discharged from the belt press (10) can be mixed with other fractions from the sandscrew and/or with PFAS stabilization agents using a pug mill or equivalent technology to provide soil for return to site, or discharged fines can be staged separately to be stabilized, incinerated, or disposed of as site, state, federal or other constraints dictate.

A PCRS can one or more either liquid emulsion polymers or dry polymers that require mixing. In the example PCRS, the floc skid (11) is an 8-ft×24-ft skid that contains two 1,500-gallon plastic tanks along with an electric transfer pump. A bag of dry flocculent is mixed with water and stirred/conditioned in one plastic tank and then transferred to the other tank for dispensing product to the clarifier. Twin 30 amp variable speed pumps are used for dispensing to provide precise control. Water for mixing is provided from the Water Storage Tank below or from an outside source as makeup water.

Clear water from the Finlay clarifier (8) flows out to a storage tank (12) that provides surge capacity and storage. The storage tank (12) also contains all water not retained in other vessels at shut down. A significant benefit to the plant configuration is no water discharge from the plant during operation, and water is disposed of only at completion of site operations. The tank typically has a capacity of 20,000 gallons and is an open top weir tank with over and under weirs for separation of oils and particulates such as fine soil organic material.

Various pumps (13) are utilized depending on the plant configuration and requirements for treatment and production rate. Electric slurry pumps manufactured by Sala, Galigher, and Warman are typically used. These pumps range in diameter up to 6-inches and horsepower from 10 to 35 (440V 3 phase) motors. A self-powered pump may also be used as the main plant pump for water from the water storage tank to the water treatment system (14). The operation of the water treatment system as modified for PFAS removal is described further below.

An example PCRS also comprises one or more discharge conveyors (15). The larger sized material, such as −4-inch x to +1 inch, from the screen plant system can be run out separately via conveyor to a bin or can be combined for further processing steps. In either case transport is accomplished by conveyor belt(s). Conversely conveyors may be used for all other product streams as well.

All plant or system components are wired through a central control panel (16) that provides for immediate shut off of power to all components for emergency conditions. A portable electric generator provides power to the components of the system. All of the components have individual start and stop controls (not shown) for the systematic start up and shut down of the plant. The typical operation is to power up components in a sequence that allows for an absence of material surging to any one component, and the sequential transfer of material from one component to another. The balance of plant operation is continuous to adjust to variation in feed material from the stockpile.

As mentioned, an example PCRS also includes a water treatment system (14). In overview operation, water from the storage tank (12) is drawn through a pump (13) to the water treatment system (14) continually during operations. First, the water is pumped through one or more sand filters to remove all suspended solids. Next, water exits the sand filter(s) though one or more granular activated carbon (GAC) tanks. From the carbon tanks water is pumped through an ion exchange (IX) resin filtration system. Then after this last stage of treatment the water is distributed to the plant. Purified water is pumped upfront to the screening plant, each sandscrew, and the belt press for example. Thus, the PCRS operates as a closed loop water treatment facility.

More specifically, once the process water passes through sedimentation and the sand filters it is directed through several 3-to-4-foot diameter Granular Activated Carbon (GAC) vessels run in parallel. The GAC used in the GAC vessels is a carbon rich product usually made from several different materials such as coconut shell (microporous) or lignite (microporous) and is efficient at removing organic material from water by adsorption and providing filtration. Process water entering the GAC vessels contains total suspended solids (TSS) that passed through the sand filters and iron complexes formed when dissolved ferrous iron is aerated in the soil washing process to form ferric iron solids by oxidation. These particles, which are smaller than the sand filters could capture, need to be filtered out to help increase the efficiency of downstream processes. The uniform particle size, packing capabilities and porosity of GAC creates a filter medium that is very efficient at trapping and filtering these very small particles out of the process water. GAC is also very efficient at removing organic compounds such as volatile organic compounds (VOCs), total organic carbon (TOC), hydrocarbons as well as PFAS. The mechanism of adsorption is achieved through dipole and induced dipole attraction of the GAC and organic polar and nonpolar molecules.

The number of GAC vessels used in the soil washing process is based upon the flow rate which varies between 300 to 500 gallons per minute (gpm) and the targeted hydraulic residence time. To effectively utilize the filtration and adsorption properties of the GAC, process water is targeted to have a hydraulic residence time in each GAC vessel of a minimum of 4 minutes and a maximum of 15 minutes. This provides enough contact time between the process water and the GAC for the kinetics of adsorption to occur and filtration to happen without process water channeling (short circuiting) through the GAC. The removal of these organic compounds and solids helps the efficiency of downstream processes and not impact the PFAS removal capacity of ion exchange (IX) resin which is the next step in the soil washing process.

Following the GAC filtration process, the process water flows to vessels that contain IX resin that is highly selective at removing PFAS. PFAS-specific IX resins have a polystyrenic backbone which is crosslinked with divinylbenzene and have a complex amino functional group (Dixit et al., 2021). Resin properties that are expected to impact the rate of PFAS removal include polymer composition (styrene vs acrylic), pore structure (gel vs macroporous) and functional group (e.g., quaternary amine, tertiary amine, etc.).

IX resin removes PFAS compounds by a process of adsorbing the hydrophobic carbon fluorine tail of the PFAS molecule to the hydrophobic backbone of the resin and the positively charged head of the PFAS molecule is attracted to and sticks to the positively charge IX sites on the resin. The dual attraction of the PFAS molecule to the resin makes it very effective at removing PFAS from the process water. For the kinetics to be most effective at treating and removing PFAS, the process water needs to be in contact with the IX media for a certain amount of time referred to as the empty bed contact time (EBCT). The minimum EBCT is 2-minutes. However, a target of 2.5 to 3.5-minute EBCT is more desirable for effective PFAS removal. The size and the shape of the IX resin vessel takes the EBCT into design consideration along with the flow velocity through the cross-sectional area of the media surface which is ideally between 6 and 12 gpm/ft$^2$. Flow velocity in this targeted range reduces the possibility of short circuiting and channeling to occur. A third design consideration incorporated into the treatment of the process water is vessel shape. The shape of the IX vessels is designed to create a plug flow through the media. A ratio of approximately 2:1 length to width is the ideal design to achieve plug flow. Therefore, the soil washing process utilizes PFAS removal vessels containing IX resin that have an approximate a 6-foot straight side wall and are 3.5 feet in diameter. The process water flow is split up between vessels run in parallel using a manifold to achieve a EBCT of approximately 2.5-3.5 minutes. Vessels are placed in a lead/lag configuration if very high concentration of PFAS are encountered or at the end of the project for final PFAS removal prior to sampling and discharge.

PFAS-specific IX resins used in the IX resin vessels tend to fall into two use categories: single use and regenerable resins. Example single-use resins include Purolite A592E, Purofine PFA694E, Amberlite PSR2, Plus, CalRes 2301, Sorbix Pure LC, and Resin Tech SIR-110-HP. When single-use resins are employed in PFAS contaminant removal systems, the resins are used until exhausted (i.e., until they cannot effectively absorb additional PFAS compounds) and then removed from the vessels and disposed of in a permitted landfill or sent for incineration. In an example PFAS embodiment, a regenerable IX resin (e.g., Sorbix RePure or equivalent) is used in the vessels. When the resin in a vessel nears exhaustion, the vessel is removed from the treatment system and the resin is flushed with a solvent-based regeneration fluid (e.g., methanol-salt or equivalent) to remove PFAS from the IX resins. Once flushed, the resins are rinsed with clean water and returned to the treatment system. The regeneration fluid is then distilled to recycle the solvent, resulting in a highly-concentrated aqueous solution that is sent to a destructive technology. Alternately, this solution may be exposed to a high-capacity single use IX resin for an extended period of time (i.e., superloaded) for immobilization of PFAS and then incinerated or disposed of in an approved landfill.

After processing through the PCRS, any remaining PFAS needs to undergo destructive treatment (17). In an example embodiment, PFAS is removed from regenerable IX resin by means of a solvent and salt solution. The solvent is distilled off and recycled, resulting in a brine with a very high concentration of PFAS. This brine solution is then treated using a destructive technology such as an enhanced contact electrical discharge plasma reactor to render the PFAS compounds into inert fluorine salts. It will be appreciated that other or additional destructive technologies such as supercritical water oxidation (SWCO), high alkaline treatment (HALT), or electrochemical oxidation may be similarly incorporated into a PCRS implementation.

Of note, the ability to subject an remaining PFAS to a destructive treatment may also be applied to a system that performs soil decontamination using other methods such as those that use reverse osmosis or nanofiltration to isolate PFAS instead or in addition to using IX resin filtration. In such systems, remaining brine may be subjected to plasma technology or other destruction technologies to render the PFAS compounds into inert fluorine salts.

Example embodiments described herein provide components, systems, processes, and methods for removing PFAS contaminants from soil. Other embodiments of the described techniques may be used for other purposes. The example embodiments described also can be practiced without some of the specific details described herein, or with other specific details. Thus, the scope of the techniques and/or functions described are not limited by the particular order, selection, or decomposition of aspects described with reference to any particular component. Also, although certain terms are used primarily herein, other terms could be used interchangeably to yield equivalent embodiments and examples. For example, it is well-known that equivalent terms in the soil engineering field and in other similar fields could be substituted for other terms. In addition, terms may have alternate spellings which may or may not be explicitly mentioned, and all such variations of terms are intended to be included.

Example

USACE Omaha District, Soil Washing Treatability Study of PFOS/PFOA-Contaminated Soil, Peterson Air Force Base (AFB), Colorado Springs, CO.

Work Self Performed: 63% self-performed including project management; removal action work plans (including UFP-QAPP and APP/SSHP); design, construction and field implementation of treatment facilities, site excavation, site restoration, waste management; sampling/chemistry QA/QC; reporting.

Scheduled completion December 2021.

Brief Description

Brice performed a field-scale Treatability Study to evaluate the effectiveness of soil washing for the removal of per- and polyfluoroalkyl substances (PFAS) contamination, specifically perfluorooctane sulfonate (PFOS) and perfluorooctanoic acid (PFOA), from soils derived from Aqueous Film-Forming Foam (AFFF) release sites at Peterson AFB. The results will be used to evaluate the effectiveness of the soil washing treatment technology in a large-scale application and will help to generate alternative strategies for the Engineering Evaluation/Cost Analysis (EE/CA) and subsequent Action Memorandum (AM) for mitigating PFAS contamination in impacted drinking water aquifers at Peterson AFB. Brice worked closely with the USACE and the customer (AFCEC/CZOM) to develop DQOs for the project.

Brice prepared a remedial action plan in the form of a Uniform Federal Policy-Quality Assurance Project Plan (UFP-QAPP), developed and implemented strict sampling analysis and chemical Quality Assurance/Quality Control (QA/QC) protocol, and drafted an Accident Prevention Plan/Site Safety & Health Plan (APP/SSHP) for USACE approval.

Following a series of bench-scale tests to optimize treatment system design, Brice excavated approximately 500 cubic yards (CY) of soil from that portion of Installation Restoration Program (IRP) Site SS014P, AFFF Spray Test Area 2, with the highest in situ concentrations of PFOS, the primary contaminant of concern for the site. The soil was transported and placed in a stockpile adjacent to the excavation and homogenized using heavy equipment to ensure relatively uniform particle size distribution and PFAS concentrations for processing through the soil washing plant. Incremental Sampling Methodology (ISM) sampling of the stockpile was performed (30 increments, triplicate samples) in order establish pre-treatment concentrations of PFAS (e.g., 3.2 mg/kg PFOS). Brice then treated 10 batches of soil through our water-based, closed-loop treatment process which uses particle size and particle density segregation techniques to 'wash' PFAS from the various soil fractions and capture the mobilized PFAS in GAC and ion exchange resins through treatment of the process water. A DoD ELAP-certified mobile lab was on-site to provide same- or next-day results for monitoring system performance. A range of treatment parameters were tested with at least three replicates to be able to statistically determine the optimum parameters for operation and maximize cost savings. The excavation was left open until the study was completed and the treated soils approved for backfill. Brice also completed chemical QA reports after assessment of results from the lab.

Brice's accomplishments included successfully processing 10 batches of soil ranging in size from 24 to 54 CY, totaling 513 CY while achieving over 99% reduction in PFAS contamination in the soils. The Brice team also completed the project ahead of schedule with zero safety incidents despite weather delays due to execution of the project in adverse, winter weather conditions.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 63/251,900, entitled "METHOD AND SYSTEM FOR REMOVING CONTAMINANTS FROM SOIL," filed Oct. 4, 2021, is hereby incorporated by reference in its entirety.

From the foregoing it will be appreciated that, although specific embodiments have been described herein for purposes of illustration, various modifications may be made without deviating from the spirit and scope of the invention as defined by the claims.

The invention claimed is:

1. A method for removing PFAS contaminants from contaminated soil and/or sediment ("soil") at a site, comprising:
   soil diagnostic testing including the steps of:
      extracting a representative sample of the contaminated soil from the site;
      segregating the sample into a plurality of size fractions according to particle size;
      segregating each of the size fractions into a plurality of density fractions according to particle density;
      testing the plurality of density fractions to determine PFAS contamination concentration levels in the sample and in process water used to remove PFAS contamination; and
   soil treatment field system design and implementation based upon the soil diagnostic testing, including:
      selecting a set of components based upon the size fractions, the density fractions, and the PFAS contamination concentration levels in those fractions;
      extracting the contaminated soil from the site;
      isolating soil fractions from the contaminated soil at the site corresponding to the identified contaminated density fractions from the sample;
      processing the isolated soil fractions to remove the PFAS contaminants therefrom;
      treating the processed soil fractions from the site corresponding to the identified contaminated fractions by one or more of deagglomeration, attrition, scrubbing, and/or exposure of soil particulates to a water-based wash solution to desorb PFAS from the soil particles and move PFAS into the process water;
      removing PFAS from the process water by performing the steps of:
         pumping the process water through one or more sedimentation or sand filters to remove suspended solids;
         filtering the water with removed suspended solids through a series of one or more granular activated carbon (GAC) vessels;
         pumping the filtered water output from the GAC vessels through one or more vessels containing an ion exchange (IX) resin, wherein the IX resin binds to PFAS compounds thereby resulting in PFAS contaminated IX resin and water free of PFAS contaminants; and returning the water free of PFAS contaminants to one or more components of a soil treatment system to continue processing the isolated soil fractions to remove the PFAS contaminants therefrom.

2. The method of claim 1, further comprising:
disposing of or incinerating the PFAS-contaminated IX resin in a manner consistent with state and Federal regulations.

3. The method of claim 1 wherein the soil field system design and implementation further comprises:
flushing the resultant PFAS contaminated IX resin with a solvent-based regeneration fluid to regenerate IX resin free of PFAS contaminants;
cleaning the IX resin free of PFAS contaminants with water; and
returning the regenerated IX resin to one or more of the vessels containing IX resin.

4. The method of claim 3, further comprising:
distilling the solvent-based regenerative fluid to produce a highly concentrated PFAS contaminated aqueous solution;
applying a destructive technology to the resultant PFAS contaminated aqueous solution.

5. The method of claim 4 wherein the destructive technology is one or more of one or more of critical water oxidation, high alkaline treatment, electrochemical oxidation, or use of a plasma generator.

6. The method of claim 4 wherein the destructive technology is an enhanced contact electrical discharge plasma reactor that renders the PFAS compounds into inert fluorine salts.

7. The method of claim 3, further comprising:
distilling the solvent-based regenerative fluid to produce a highly concentrated PFAS contaminated aqueous solution;
exposing the distilled solvent-based regenerative fluid to a single use IX resin for an extended period of time to cause superloading of the single use IX resin and thereby immobilizing the PFAS contaminants; and
disposing of or incinerating the superloaded single use IX resin.

8. The method of claim 1, further comprising:
applying a destructive technology to any PFAS contaminated brine resulting from removing PFAS from the process water.

9. The method of claim 1 wherein the selecting a set of components further comprises selecting a type and mesh size of one or more screens and/or a size and number of sandscrews, based upon particle size distribution.

10. The method of claim 1 wherein the selecting a set of components further comprises selecting a type of flocculation or coagulation polymer based upon particle size distribution.

11. The method of claim 1 wherein the selecting a set of components further comprises selecting one or more of: clarifiers, equipment for dewatering fines, total system retention time, log washers, clay washers, screens for vegetation removal, water volumes, type of ion exchange resins, and number or size of water treatment vessels.

12. The method of claim 1 wherein the selecting a set of components further comprises selecting the life expectancy of IX resins before media changeout or regeneration is required based upon determined PFAS concentration levels.

13. The method of claim 1 wherein the ion exchange resin is a single use resin.

14. The method of claim 13 wherein the ion exchange resin is selected from a set consisting of: Purolite A592E, Purofine PFA694E, Amberlite PSR2, Plus, CalRes 2301, Sorbix Pure LC, and Resin Tech SIR-110-HP.

15. The method of claim 1 wherein the ion exchange resin is a regenerable resin.

16. The method of claim 15 wherein the ion exchange resin is Sorbix RePure.

17. The method of claim 1 wherein the ion exchange resin is a resin having a polystyrenic backbone crosslinked with divinylbenzene and having a complex amino functional group.

18. A method for removing PFAS contaminants from contaminated soil and/or sediments ("soil") at a site, comprising:
soil diagnostic testing including the steps of:
extracting a representative sample of the contaminated soil from the site;
segregating the sample into a plurality of size fractions according to particle size;
segregating each of the size fractions into a plurality of density fractions according to particle density;
testing the plurality of density fractions to determine PFAS contamination concentration levels in the sample and in process water used to remove PFAS contamination; and
soil field system design and implementation based upon the soil diagnostic testing, including:
selecting a set of components based upon the size fractions, the density fractions, and the PFAS contamination concentration levels in those fractions;
extracting the contaminated soil from the site;
isolating soil fractions from the contaminated soil at the site corresponding to the identified contaminated density fractions from the sample;
processing the isolated soil fractions to remove the PFAS contaminants therefrom;
treating the processed soil fractions from the site corresponding to the identified contaminated fractions by one or more of deagglomeration, attrition, scrubbing, and/or exposure of soil particulates to a water-based wash solution to desorb PFAS from the soil particles and move PFAS into the process water;
removing PFAS from the process water by performing the steps of:
pumping the process water through one or more sedimentation or sand filters to remove suspended solids:
filtering the water with removed suspended solids through a series of one or more granular activated carbon (GAC) vessels;
pumping the filtered water output from the GAC vessels through one or more of an ion exchange filtration process, reverse osmosis, or nanofiltration to substantially remove PFAS contaminants;
applying a destructive technology to any PFAS contaminated brine resulting from the exchange filtration, reverse osmosis, or nanofiltration process, thereby resulting in water free of PFAS contaminants; and
returning the water free of PFAS contaminants to one or more components of a soil treatment system to continue processing the isolated soil fractions to remove the PFAS contaminants therefrom.

19. The method of claim 18 wherein the destructive technology is one or more of one or more of critical water oxidation, high alkaline treatment, electrochemical oxidation, or use of a plasma generator.

* * * * *